United States Patent Office 3,072,587
Patented Jan. 8, 1963

3,072,587
STABILIZED METHYLOLATED POLYACRYLAMIDE AQUEOUS SOLUTIONS AND PROCESS FOR PREPARING SAME
Glenn H. Perkins, West Peru, Maine, assignor to Oxford Paper Company, Rumford, Maine, a corporation of Maine
No Drawing. Filed Nov. 21, 1960, Ser. No. 70,386
4 Claims. (Cl. 260—29.4)

This invention relates to stabilized methylolated polyacrylamide and to the process for preparing same. More particularly, this invention relates to the process of methylolating polyacrylamide solutions by means of a methylolating agent containing formaldehyde and tris (hydroxymethyl) nitro methane.

Polyacrylamide and its copolymerization products have been employed in such fields as adhesives, thickening agents, suspending agents, paper, textiles, leather, photographic arts, surface coatings, etc. The stabilized methylolated polyacrylamide of this invention is particularly useful in the preparation of planographic printing plates.

Planographic printing plates can be prepared, as more fully described in United States Patent No. 2,930,317 issued March 29, 1960, by forming an aqueous coating composition comprising a pigment and a methylolated polyacrylamide. This aqueous coating composition is then applied in a conventional manner to the surface desired and the coating heated in the presence of a catalyst to effect a cross-linking of the methylolated polyacrylamide to form an insoluble hydrophilic planographic surface.

These planographic printing plates are used to reproduce images which have been applied to the planographic surface of the plate. The image is oleophilic in nature in that it attracts oily or greasy substances and is essentially water repellent. The unimaged portion of the planographic surface is hydrophilic to the extent that it can easily be wet by water but also be able, before wetting, to accept and hold an oily or greasy image. Planographic surfaces must have this hydrophilic-oleophilic balance so that the oily or greasy image can be applied thereto and the unimaged area wet by water. The planographic surface thus prepared and imaged is subjected to treatment by an etch solution which prepares the plate for printing. The etch solution is repelled by the image portion of the plate but is attracted by the unimaged area. The unimaged area, therefore, is covered by a surface film of the etch solution leaving the image portion alone ink receptive.

The methylolated polyacrylamide, which is commercially available, has several disadvantages. The principal disadvantages are that solutions of the methylolated polyacrylamide tend to gel whenever the concentration of the solution is over about 1½ to 2 percent. Furthermore, these solutions must generally be maintained within a narrow pH range of from about 6.5 to 7, otherwise the solution will again tend to gel.

It has been found that when polyacrylamide is methylolated with formaldehyde in the presence of tris (hydroxymethyl) nitro methane, the resultant polyacrylamide is significantly more stable than in the case where the tris (hydroxymethyl) nitro methane is not employed. These stabilized methylolated polyacrylamide solutions may be maintained for long periods of time at concentrations of 5 or 6 percent or more. Moreover, these solutions may be maintained at a pH range which is far less critical than heretofore has been possible. These solutions may now be stored at a pH range of about 5 to 7. From the commercial standpoint, it is highly advantageous to now be able to maintain solutions of methylolated polyacrylamide which are of much higher concentration and which may be maintained within a broader pH range.

Broadly, the invention consists of reacting under alkaline conditions a solution of polyacrylamide with a methylolating agent containing formaldehyde and tris (hydroxymethyl) nitro methane. The usual methylolating techniques, readily understood by those skilled in the art, may be employed except that tris (hydroxymethyl) nitro methane is included in the methylolating agent.

Specific examples of the polyacrylamide which may be used according to this invention include the various commercially available polyacrylamides such as those designated by the trade names PAM 100, PAM 75, PAM 50, all marketed by the American Cyanamid Company.

The methylolating agent which can be used according to the invention comprises a mixture containing tris (hydroxymethyl) nitro methane and either formaldehyde or any suitable formaldehyde donor.

The exact nature of the reaction which takes place between the polyacrylamide, formaldehyde, and the tris (hydroxymethyl) nitro methane is not completely understood. Under the methylolating conditions such as hereinafter described, the tris (hydroxymethyl) nitro methane gradually breaks down. As it breaks down at least some formaldehyde is liberated and this, along with the formaldehyde already present, probably enters into the methylolation reaction. The tris (hydroxymethyl) nitro methane, however, if used alone will result in a polyacrylamide of a rather low degree of methylolation. Apparently there is a unique interreaction that takes place when the polyacrylamide is methylolated with formaldehyde in the presence of tris (hydroxymethyl) nitro methane, so that the resultant product is surprisingly stable at high concentrations and within a rather broad pH range.

The methylolation of the polyacrylamide can advantageously be carried out in an aqueous medium by dissolving the polyacrylamide in water. Paraformaldehyde and tris (hydroxymethyl) nitro methane (dry) are then dissolved in this polyacrylamide solution. The pH of the solution is adjusted to about 9 with 10% sodium hydroxide and stirred until the solution is clear. The pH is then adjusted to about 10 with the addition of a further amount of sodium hydroxide. The solution is then heated for about 1 hour at about 55° C. while the pH is maintained at about 10. After the methylolation is completed, the pH is reduced from about 10 to about 5–7 and the product cooled. The resultant solution of methylolated polyacrylamide can be stored almost indefinitely at a high concentration and at a pH range that can vary from about 5–7.

The methylolation process of course can be varied considerably as is understood by one skilled in the art, for example, the formaldehyde/polyacrylamide ratio, the formaldehyde/tris (hydroxymethyl) nitro methane ratio, the time, temperature, pH, alkali, etc., can vary considerably. All the usual variations which might normally be made in methylolation processes can be employed, except that the methylolation must take place in the presence of the tris (hydroxymethyl) nitro methane. Solutions of methylolated polyacrylamide having a satisfactory degree of methylolation, that is, having sufficient hydroxymethyl groups available for cross-linking and insolubilization, can therefore be readily prepared for use in planographic printing plates, and these solutions can be stored at high concentrations for long periods of time without gelling.

The amount of tris (hydroxymethyl) nitro methane which can be used can of course vary considerably. It has been found advantageous, however, to employ the tris (hydroxymethyl) nitro methane and formaldehyde (advantageously in the form of paraformaldehyde), in a ratio varying from about 4:1 to 1:1.

It is understood that the use of the term polyacrylamide as used herein includes within its scope the various equivalent derivatives thereof such as polymethacrylamide and the like and also the various equivalent co-polymer systems. For example, methacrylamide has been polymerized and then methylolated according to the process of this invention. The methylolated product was more stable than a polymethacrylamide solution which was methylolated in the usual manner using only formaldehyde. Methacrylamide is somewhat more difficult to polymerize than acrylamide so that generally there is less tendency for a methylolated polymethacrylamide to gel. However, even these solutions are substantially more stable when methylolated in the presence of tris (hydroxymethyl) nitro methane.

The following examples, by way of illustration only, describe in detail the process of preparing stabilized methylolated polyacrylamide according to this invention. Parts are by weight.

Example 1

10 parts of polyacrylamide marketed under the trade name PAM 75 by the American Cyanamid Company were dissolved in 148 parts of water. A methylolating agent containing 5.8 parts of tris (hydroxymethyl) nitro methane and 3.9 parts of paraformaldehyde were then added in dry form to the solution. The PH was adjusted to 9 and the solution stirred until it was clear. The solution was then adjusted to pH 10 with 10% sodium hydroxide and the temperature then raised to 55° C. and maintained there for 1 hour. After the 1-hour time period the solution was cooled to 25° C. and the pH was adjusted to about 5.6 with 50% acetic acid. The resultant methylolated polyacrylamide solution was still stable after 5 months.

Example 2

A methylolated polyacrylamide solution was prepared according to the process of Example 1 except that the methylolating agent contained 3.9 parts paraformaldehyde and no tris (hydroxymethyl) nitro methane. The resultant solution had gelled within 24 hours.

Example 3

A methylolated polyacrylamide solution was prepared according to the process of Example 1 except that the methylolating agent contained 7.7 parts paraformaldehyde and no tris (hydroxymethyl) nitro methane. The resultant solution had gelled within 12 days.

Example 4

15 parts of polyacrylamide marketed under the trade name PAM 50 by the American Cyanamid Company were dissolved in 148 parts of water. A methylolating agent containing 8.9 parts of tris (hydroxymethyl) nitro methane and 5.8 parts of paraformaldehyde were then added in dry form to the solution. The polyacrylamide was then methylolated as shown in Example 1. The resultant product was still stable after two weeks. A methylolated polyacrylamide solution, made according to the same procedure, except employing no tris (hydroxymethyl) nitro methane, gelled and became unusable within 48 hours.

Example 5

7.5 parts of polyacrylamide marketed under the trade name PAM 50 by the American Cyanamid Company were dissolved in 148 parts of water. A methylolating agent containing 4.5 parts tris (hydroxymethyl) nitro methane and 2.9 parts of paraformaldehyde were then added in dry form to the solution. The polyacrylamide was then methylolated as shown in Example 1. The resultant product was still stable after two weeks. A methylolated polyacrylamide solution made according to the same procedure, except employing no tris (hydroxymethyl) nitro methane, gelled and became unusuable within 48 hours.

Example 6

Methylolated polyacrylamide was prepared according to the procedure of Example 1 except that the methylolating agent contained 5 parts of tris (hydroxymethyl) nitro methane and 4 parts of paraformaldehyde. The resultant product was still stable after several months and was advantageously employed in the production of planographic printing plates.

I claim:

1. The process of preparing stabilized aqueous solutions of methylolated polyacrylamide which comprises reacting a polyacrylamide with a methylolating agent containing formaldehyde and tris (hydroxymethyl) nitro methane in an aqueous medium at an alkaline pH to form a methylolated polyacrylamide characterized by its stability within a pH range of between about 5 and 7.

2. The process of claim 1 in which the ratio of the tris (hydroxymethyl) nitro methane to formaldehyde is within the range of about 4:1 to 1:1.

3. The process of claim 1 in which the ratio of the tris (hydroxymethyl) nitro methane to formaldehyde is about 1.5:1.

4. A stabilized methylolated polyacrylamide aqueous solution made according to the process of claim 1.

References Cited in the file of this patent

UNITED STATES PATENTS

| | | |
|---|---|---|
| 2,484,315 | Scott | Dec. 28, 1948 |
| 2,808,383 | Fikentscher et al. | Oct. 1, 1957 |